United States Patent [19]

Moulson

[11] Patent Number: 5,991,734
[45] Date of Patent: Nov. 23, 1999

[54] METHOD OF MEASURING THE CREATIVE VALUE IN COMMUNICATIONS

[76] Inventor: Thomas J. Moulson, 1100 Sea La., Corona Del Mar, Calif. 92625

[21] Appl. No.: 08/905,606

[22] Filed: Aug. 4, 1997

[51] Int. Cl.[6] .............................. H04N 7/00; G06F 15/21
[52] U.S. Cl. .............................. 705/10; 705/10; 705/402; 348/2; 348/1; 358/447; 358/469; 455/4.2
[58] Field of Search ..................... 705/10, 402; 358/447, 358/469; 455/42; 348/2

[56] References Cited

U.S. PATENT DOCUMENTS

| | | | |
|---|---|---|---|
| 4,647,964 | 3/1987 | Weinblatt | 455/2 |
| 5,041,972 | 8/1991 | Frost | 705/10 |
| 5,227,874 | 7/1993 | Kohorn | 348/2 |
| 5,812,642 | 9/1998 | Leroy | 705/10 |

OTHER PUBLICATIONS

Kover et al, To whom do advertising creatives write? An inferential answer, Journal of Advertising Research, Jan. 1, 1997.

*Primary Examiner*—James P. Trammell
*Assistant Examiner*—Nga B. Nguyen
*Attorney, Agent, or Firm*—Drummond & Duckworth

[57] ABSTRACT

This invention relates to a method for measuring the creative value added to a communication, such as an advertisement in the media of print, television or radio. In a preferred embodiment, the invention provides a quantitative measure of the creative value added to a communication. To this end, a communication test sample is compared to a creativity neutral control which is a communication which intentionally lacks any creativity.

14 Claims, 1 Drawing Sheet

METHOD OF MEASURING THE CREATIVE VALUE IN COMMUNICATIONS

BACKGROUND OF THE INVENTION

This invention relates to quantitative methods for evaluating the effectiveness of a particular communication.

More particularly, the invention concerns a method for quantifying the effectiveness of creativity in communications, thus enabling advertisers to preselect the best communication strategies, themes and executions for their purpose so as to maximize the persuasive effect and cost effectiveness of media expenditure.

Mass communications such as television, print, radio and the Internet are used by the sponsors of products, services, or social ideas to present their offerings to the public. These communications are professionally prepared and placed by advertising and public relations agencies who are paid a fee for this purpose. Because of the high cost of media, as well as the desire to persuade as large an audience as possible, methods have been created to evaluate concepts and executions on the part of advertisers, promoters, political organizations and the like. Such methods are commonly referred to as concept testing or pre-testing and have been performed using field surveys, personal interviews and focus groups to generate and evaluate a communication concept before it is run to modify, select or reject it. Testing is typically conducted by professional market research agencies which recruit samples of respondents statistically representative of the prospective audience to create a test audience. The research process may be quantitative, meaning the findings are projectable by the use of mathematical sampling theory; or may be qualitative, in which the responses of individuals are noted. Because quantitative findings cannot be statistically projected, judgement rather than sampling theory is used to make decisions regarding the subject communication.

The market research agencies recruit the respondents for pretesting, administer the test questions and collect and process the answers to questions. If the testing is quantitative, a questionnaire is used and answers are recorded either by the interviewer or by the respondent. In order to eliminate position bias, the question sequences are normally rotated. The data recorded may include one or more measure of the respondents interest in the product or service communicated, and attitude toward it, as well as such control data as demographics, brand preferences and purchasing habits.

Existing techniques for measuring the effectiveness of communication include techniques often called pre-post, comparative, recall, normative levels and on-air. The pre-post technique requires the recording of a respondent's attitude toward a product both before and after seeing an advertisement. A typical overall measure of the respondent's interest in buying the product is measured on a 1–10 scale. The comparative technique requires providing several advertisements to a respondent at one time and comparing their effectiveness in terms of buying interest and attitudes to the product attributes. The recall technique involves showing respondents several advertisements and thereafter asking them to name those which they can recall. Meanwhile, the normative levels technique involves comparison of a communication test sample with the average levels of similar, previous tests among similar products, which are used as performance bench marks. Finally, the on-air technique entails placing recording devices in sample respondent's homes to record their viewing patterns.

Testing techniques for determining the effectiveness of communication are also disclosed in U.S. Pat. Nos. 4,647,964 and 5,041,972. U.S. Pat. No. 4,647,964 discloses an apparatus including a television monitor connected to three (3) distinct video tape recorders. A respondent controls a switch interconnected to the video recorders so that only one program is in operation at any one time. The respondent's viewing patterns are then analyzed to determine the effectiveness of television commercials. U.S. Pat. No. 5,041,972 discloses the use of a linear attribute scale ranging from 0–10. Using a handheld controller, the respondent causes a cursor to move along the attribute scale for computer recording.

Many of the above test methods seek to isolate the advertisement from extraneous factors for clinical assessment. Other test methods seek to increase the realism of the test environment by inserting the test advertisement among other advertisements as they would appear in print or television. Sometimes these methods will be combined. However, these conventional tests do not measure the "creativity" of the advertisement. Instead the testing techniques measure the combined effects of the attributes of the product, the already established goodwill of the company, popularity of the particular item being sold, as well as the creativity of the advertisement.

Creativity is the novel way in which a message is presented with the intent of drawing attention to a particular audience, positioning a product as appealing as possible, and generating interest in the purchase of the item. The use of humor, color, situation, demonstration, etc. adds to the interest in appeal of a product. Conversely, misjudged creativity can detract from the appeal of a product. Furthermore, creativity can increase the persuasive power of a message by attracting greater attention or changing important audience attitudes, or can negate a message by being dull, setting the wrong tone, or giving offense. Creativity is of crucial importance to advertisers because it can achieve more without having to cost more.

Accordingly, it would be highly desirable to provide a method for quantitatively measuring the creative value added to a communication, such as a print, television or radio advertisement.

SUMMARY OF THE INVENTION

Briefly, in accordance with the invention, I provide a method for quantifying the value added by the creativity in a specific communication. Such quantification enables advertisers to select the best communication strategies, themes and advertising mediums for their purposes so as to maximize the persuasive effect and cost effectiveness of the media expenditure.

The method of the present invention uses a creative neutral control which is a communication which intentionally lacks creativity, against which a proposed communication test sample is tested among separate, but statistically matched test groups.

With this invention, the creative value added to a proposed communication is quantified by first presenting the communication test sample to a test audience and by presenting a creativity neutral control to a test audience. The responses to the communication test sample and creativity neutral control are then compared in a controlled environment to determine the creative value added to the communication test sample.

In a preferred embodiment, the test audience is divided into two separate test groups, with the communication test sample being presented to the first test group and the creativity neutral control being presented to the second test group. In still another preferred embodiment, the first test group is presented both a communication test sample and a comparable communication. Meanwhile, the second test group is presented a creativity neutral control as well as the comparable communication.

As would be understood by those in the art, the present invention is capable of testing any type of communication sample, including advertisements, promotions, political ideas, etc. However, the present invention is ideally suited for the testing of the advertisements presented in all types of media such as television, print, radio and the Internet. For example, for a preferred practice of the present invention, the communication test sample is an advertisement for a product, the creative neutral control is an advertisement for the identical product as the communication test sample with the advertisement intentionally lacking in any creativity, and the comparable communication is an advertisement for an alternative product. Preferably, the alternative product is a directly competing product. However, the alternative product need not be directly competing with the product displayed in the communication test sample, and not necessarily even a product in the same category of products as long as the product in the alternative product represents a meaningful purchase alternative to those in the test group.

The first test group is asked which product they prefer between the product presented in the communication test sample and the product presented in the alternative communication, while the second test group is asked their preference between the product presented in the creativity neutral control and the alternative communication. Thereafter, the results of the first and second group are quantified and compared to determine the creativity added to the communication test sample.

In still another preferred embodiment, image descriptors are applied to the communication test sample, creativity neutral control and comparable communication. For example, the test groups are requested to give their preference between the aesthetics, functionality, cost, appeal for manufacturer, etc. between the communication test sample and the comparable communication (first test group), and the creativity neutral control and the comparable product (second test group). Image descriptors are particularly effective in the practice of the present invention as a guide to understanding the probable reasons for high or low creative value added, and for discovering what claims are most effective as the basis for a communication strategy.

In still another preferred embodiment, multiple advertisements are tested for multiple products at one time. For example, each individual of the first test group and second test group sees twenty (20) communication test samples and ten (10) creativity neutral controls. The commercials are viewed in pairs interspersed by sixty second question and answer pauses. The multiple testing reduces the cost per test without any individual of the respective test groups having to see a commercial twice.

Accordingly, it is a principle object of the present invention to provide a method for measuring the creativity of a communication test sample.

It is an additional object of the invention to provide a quantitative measure of the creativity of a communication test sample.

These and other, further and more specific objects and advantages of the invention would be apparent to those skilled in the art from the following detailed description taken in conjunction with the drawings.

DETAILED DESCRIPTION OF THE PREFERRED EMBODIMENTS

Figure 1:
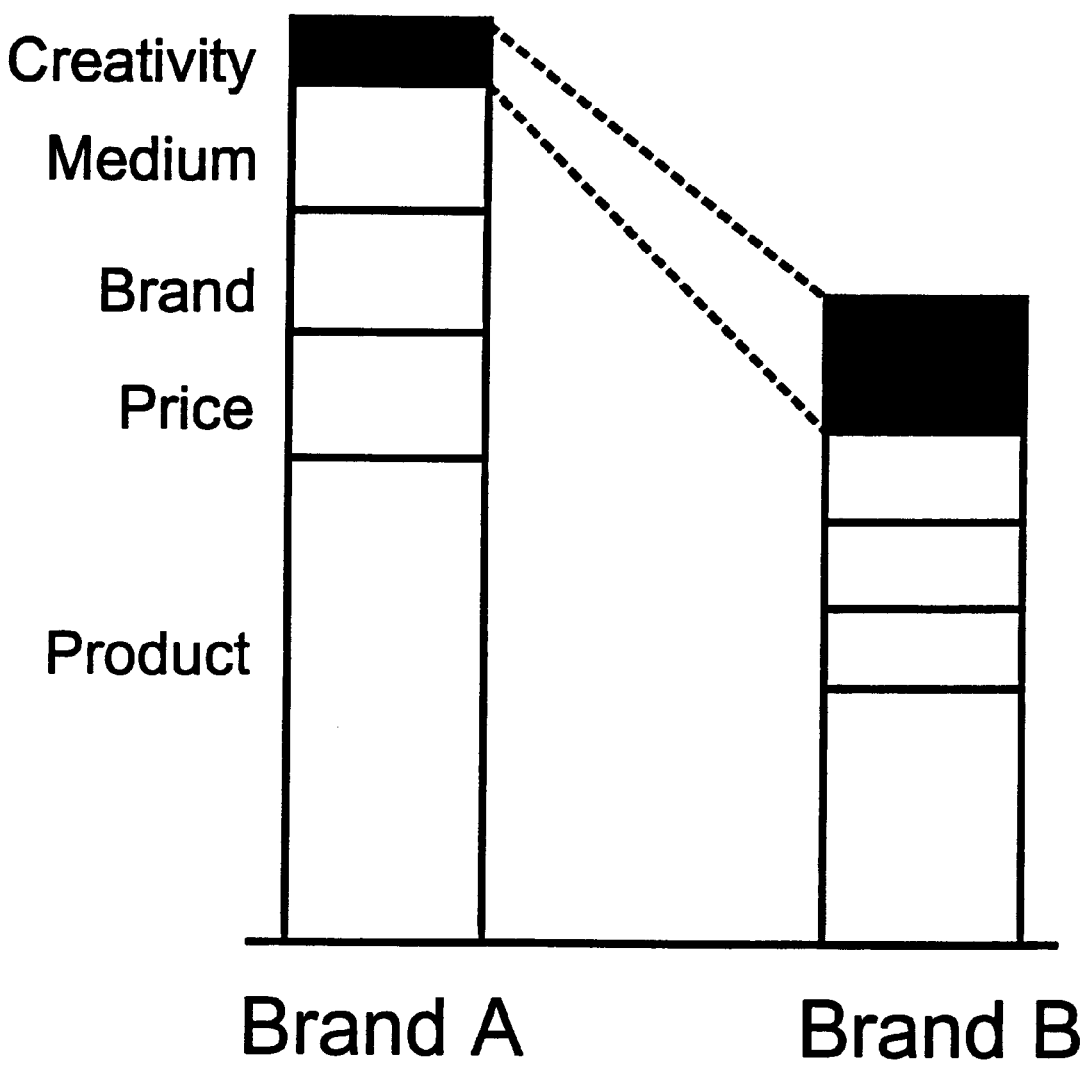
FIG. 1 is a graphical depiction of the creativity for two (2) distinct advertisements which is measured by practice of the present invention.

While the present invention is susceptible of embodiment in various forms, hereinafter will be described the presently preferred embodiments of the invention with the understanding that the present disclosure is to be considered as an exemplification of the invention, and is not intended to limit the invention to the specific embodiments illustrated.

Communications are advertising and public relations messages in all media including television, print, radio, Internet, etc. that are intended to persuade. With reference to FIG. 1, the communications effectiveness is a result of many factors, in the case of an advertisement for a product, the effectiveness is the combined effect of the products intrinsic appeal including functionality, aesthetics and emotional attraction, price, the goodwill of the sponsor, the medium such as television, print or radio bringing this information to potential consumers, and creativity. Creativity is the manner in which messages are communicated for the best intended effects, and is the function of professionals advertising in public relations to add creativity to maximize the advertising value.

The concept of creative value added is familiar in business, but it's measure in the field of advertising has proved elusive. For the purposes of this invention, creative value added is defined as the improvement made by creative treatment towards the purpose of a communication in addition to the starting assumptions. The purpose may be to increase buying interest, generating shopping traffic, or to create or change a product's image.

The present invention is the first method for quantifying the value added by creativity in a communication test sample. The method uses a creativity neutral control version of the communication test sample. The creativity neutral control is a concept having the same physical characteristics of the test communication. For example, where the communication test sample is a print advertisement, the creativity neutral control will have the same size, placement, appearance, and quality as the communication test sample. If the communication test sample is intended to be story board or animatic, the creativity neutral control will share the same format. Similarly, if the communication test sample is a television commercial, the creativity neutral control will be of the same duration, and be viewed by a test group on an identical monitor at the same audio volume level. In addition, the creativity neutral control will include the starting assumptions of the product to be advertised which will normally include brand, price and key product attributes. The content of the creativity neutral control will depend on the purpose of the test.

In the practice of the present invention, the communication test sample and the creativity neutral control is presented to a test audience of one or more persons. The test audience is then questioned to provide their attitudes towards the communication test sample and the creativity neutral control. In the most simplified version of the present invention, the attitude of the test audience toward the communication test sample and creativity neutral control is then compared to provide a measure of the creative value added to the communication test sample. Preferably, the test audience is divided into two test groups with the communication test sample being presented to the first test group, and the creativity neutral control being presented to the second test group.

In an additional embodiment, paired choices are used to achieve the greatest sensitivity of test audience response. A communication test sample and a comparable communication are presented to the first group of the test audience. The comparable communication, in the case of an advertisement, advertises a product which is comparable, or competitive, to the product shown in the communication test sample. Meanwhile, the creativity neutral control and the comparable communication is shown to the second test group. The first group is requested to provide their preferences and attitudes towards the products in the communication test sample and comparable communication, while the second test group is requested to provide their preferences and attitudes towards the creativity neutral control and comparable communication. These results are quantified and then compared to provide a measure of the creativity added to the communication test sample.

The following table illustrates a simplified test exemplifying the paired choice embodiment of the present invention.

|  | First Test Group Brand A Test Ad And Brand B Ad Seen % | Second Test Group Brand A Creativity-Neutral Ad And Brand B Ad Seen % |
|---|---|---|
| Would Buy . . . |  |  |
| Brand A | 60 | 55 |
| Brand B | 30 | 35 |
| No Preference | 10 | 10 |
|  | 100 | 100 |
| Brand A Over/(Under) Brand B | 30 Pts. | 20 Pts. |
|  | Creativity Value Added 10 Pts. | |

In the above hypothetical test, Brand A is the communication test sample undergoing pre-testing. A first test group of 100 people, representative of prospective consumers, see communication test sample "Brand A" and an advertisement, actual or fabricated, for Brand B. Meanwhile, a second test group of 100 people see a creativity neutral control for Brand A and the same Brand B advertisement. After viewing Brand A's communication test advertisement against Brand B's advertisement, Brand A is preferred to Brand B by 30 percentage points (60 percentage points compared to 30 percentage points) by the first test group. After viewing the creativity neutral control for Brand A and the Brand B advertisement, Brand A is preferred to Brand B by only 20 percentage points (55 percentage points compared with 35 percentage points) by the second test group. Thus, the test ad does better than the creativity neutral ad, with a creative value added of 10 percentage points (30 percentage points less 20 percentage points). This example includes 100 persons in each test group for simplicity purposes. However, it would be preferred that each test group include 150 persons or more to provide additional statistical accuracy.

The following table illustrates an example of an effective 30-second television commercial. The test applies the paired choice embodiment as well as the use of image descriptors to provide information regarding the probable reasons for high or low creative value added.

EXAMPLE OF AN EFFECTIVE 30-SECOND TELEVISION COMMERCIAL

| | Version of Automobile A Viewed (Against Constant Automobile B Ad) | | |
|---|---|---|---|
| | Test Ad (Creative) | Control Ad (Creativity-Neutral) | Result: Creative Value Added |
| After Viewing Ads, Would Prefer . . . | | | |
| Automobile A | 79 | 65 | — |
| Automobile B | 6 | 17 | — |
| No Preference | 15 | 18 | — |
| Total | 100 | 100 | — |
| Automobile A Over Automobile B | 73 | 48 | 25 |
| Car Perceived as Better For Handling | | | |
| Automobile A | 65 | 45 | — |
| Automobile B | 11 | 17 | — |
| No Preference | 24 | 38 | — |
| Total | 100 | 100 | — |
| Automobile A Net Better/ (Worse) Than Automobile B for "handling" Similarly, Automobile A Perceived As Net Better/(Worse) than Automobile B for . . . | 54 | 28 | 26 |
| Appearance | 89 | 69 | 20 |
| Engine Performance | 60 | 45 | 15 |
| Fun and Excitement | 92 | 80 | 12 |
| Prestige | 68 | 59 | 9 |
| Quality | 43 | 37 | 6 |
| Roominess and Comfort | 21 | 19 | 2 |
| Value for Money | 28 | 31 | -3 |
| Safety Features | 26 | 40 | -14 |
| The More Interesting Ad Manufacturer Preferred | 62 | -17 | 79 |
| Automobile A's Over/(Under) Automobile B's | 65 | 38 | 27 |

The foregoing example illustrates a communication test sample advertising Automobile A. The first test group is shown the test sample for Automobile A and an advertisement for Automobile B. The second test group is shown a creativity neutral control advertisement for Automobile A as well as the advertisement for Automobile B. For example, the creativity neutral control advertisement consists of a color picture of Automobile A with a headline announcing the make, model year and model with a voice-over listing the automobile's price and standard features. Meanwhile, the advertising test sample for Automobile A includes additional positive images.

After viewing the test advertisement for Automobile A and the advertisement for Automobile B, the first test group prefers Automobile A to Automobile B by 73 percentage points (79% compared with 6%). Meanwhile, after viewing the creativity neutral control for Automobile A and the advertisement for Automobile B, Brand A is only preferred to Brand B by 48 percentage points (65% compared with 17%). Thus, the Brand A test advertisement does better than the creativity neutral control advertisement, with a creative value added of 25 points (73 percentage points less 48 percentage points). The above table is simplified with respect to the image descriptors (handling, appearance, engine performance, fun and excitement, prestige, etc.) with the numbers already reflecting the comparison by the first group of the test advertisement for Automobile A against the Automobile B advertisement, and the comparison by the second test group of the creativity neutral control for Automobile A against the advertisement for Automobile B. As shown in the table, the test advertisement is particularly effective for enhancing Automobile A's image for handling, appearance and fun and excitement.

The following table illustrates an example of an ineffective 30-second television commercial.

EXAMPLE OF AN INEFFECTIVE 30-SECOND TELEVISION COMMERCIAL

| | Version of Automobile C Viewed (Against Constant Automobile D Ad) | | |
|---|---|---|---|
| | Test Ad (Creative) | Control Ad (Creativity-Neutral) | Result: Creative Value Added |
| After Viewing Ads, Would Prefer . . . | | | |
| Automobile C | 17 | 17 | — |
| Automobile D | 58 | 62 | — |
| No Preference | 25 | 21 | — |
| Total | 100 | 100 | — |
| Automobile C Over/ (Under) Automobile D | −41 | −45 | 4 |
| Car Perceived As Better For Appearance | | | |
| Automobile C | 21 | 12 | — |
| Automobile D | 61 | 68 | — |
| No Preference | 18 | 20 | — |
| Total | 100 | 100 | — |
| Automobile C Net Better/ (Worse) than Automobile D for "appearance" | −40 | −56 | 16 |
| Similarly, Automobile C Perceived As Net Better/ (Worse) than Automobile D for . . . | | | |
| Fun and Excitement | −48 | −58 | 10 |
| Handling | −20 | −25 | 5 |
| Prestige | −26 | −28 | 2 |
| Quality | −6 | −7 | 1 |
| Engine Performance | −21 | −14 | −7 |
| Roominess and Cormfort | −15 | −6 | −9 |
| Value for Money | −21 | −6 | −15 |
| Safety Features | −19 | −7 | −12 |
| The More Interesting Ad | −38 | −64 | 26 |
| Manufacturer Preferred | | | |
| Automobile C's Over/(Under) Automobile D's | −7 | 21 | −28 |

Again, the creativity neutral control advertisement consists of a color picture of Automobile C with a headline announcing the make, model year, and a voice-over listing the car's price and standard features. As shown above, although the test sample advertisement is considered more interesting than the creativity neutral advertisement, the test commercial generates as many negative responses as positive images towards Automobile C and adds little creative value (a statistically insignificant four percentage points).

In an additional embodiment of the present invention, a method is provided for testing multiple communication test samples. The following table illustrates the preferred embodiment for testing twenty (20) advertisements for multiple products, or for alternative advertising candidates for the same product.

PATTERN FOR MULTIPLE TESTING OF TWENTY 30-SECOND TELEVISION SPOTS

| FIRST TEST GROUP | | SECOND TEST GROUP | |
|---|---|---|---|
| Test 1 | Test 2 | Control 1 | Test 2 |
| 60-second Q & A | | 60-second Q & A | |
| Control 3 | Test 4 | Test 13 | Control 14 |

-continued

| FIRST TEST GROUP | SECOND TEST GROUP |
|---|---|
| 60-second Q & A | 60-second Q & A |
| Test 15     Control 16 | Test 3      Test 4 |
| 60-second Q & A | 60-second Q & A |
| Test 5      Test 6 | Control 5   Test 6 |
| 60-second Q & A | 60-second Q & A |
| Control 7   Test 8 | Test 17     Control 18 |
| 60-second Q & A | 60-second Q & A |
| Test 19     Control 20 | Test 7      Test 8 |
| 60-second Q & A | 60-second Q & A |
| Test 9      Test 10 | Control 9   Test 10 |
| 60-second Q & A | 60-second Q & A |
| Control 11  Test 12 | Test 1      Control 2 |
| 60-second Q & A | 60-second Q & A |
| Test 3      Control 4 | Test 11     Test 12 |
| 60-second Q & A | 60-second Q & A |
| Test 13     Test 14 | Control 13  Test 14 |
| 60-second Q & A | 60-second Q & A |
| Control 15  Test 16 | Test 5      Control 6 |
| 60-second Q & A | 60-second Q & A |
| Test 7      Control 8 | Test 15     Test 16 |
| 60-second Q & A | 60-second Q & A |
| Test 17     Test 18 | Control 17  Test 18 |
| 60-second Q & A | 60-second Q & A |
| Control 19  Test 20 | Test 9      Control 10 |
| 60-second Q & A | 60-second Q & A |
| Test 11     Control 12 | Test 19     Test 20 |
| 60-second Q & A | 60-second Q & A |

The more advertisements that can be tested in one session with the same respondents, the lower the cost per communication test sample. At the same time, lengthening the duration of a session can incur additional faculty and personnel costs and also runs the risk of fatigue to the individuals of the test groups. The above sequence maximizes the number of advertisements that can be tested in a given time frame. Multiple advertisements are evaluated in consecutive pairs among two matched samples. The pattern of testing is designed to insure that no respondent sees the same advertisement twice which would incur redundant costs and the risk of respondent bias, and insure that each respondent sees the same number of test communications and creativity neutral controls. This testing further insures that the creativity neutral controls are evenly spaced in order to reduce the possibilities of bias due to possible differences in style between communication test samples and creativity neutral controls.

As shown in the above table, each of the two test groups see twenty (20) test commercials and ten (10) creativity neutral controls. The commercials are viewed in pairs of consecutive commercials with the pairs interrupted by 60-second question and answer pauses. For example, the creative value of Test 1 is evaluated by comparing a first group's measured attitudes of Test 1 and Test 2 with those of the second group's measured attitudes toward Control 1 and Test 2. Similarly, the creative value added of Test 2 is determined by comparing the first group's attitudes of Test 1 and Test 2 with those of the second test group's attitudes of Test 1 and Control 2. The creative value added can be determined for all twenty (20) test commercials in the same manner.

Having described the invention is such terms as to enable one skilled in the art to make and use it and, having identified the presently best mode of practicing it, I claim:

1. A method of measuring the creative value of a communication test sample comprising:

presenting a communication test sample to a test audience of one or more persons;

presenting a creativity neutral control to a test audience of one or more persons, the creativity neutral control being a communication which is created to intentionally lack creativity; and comparing the communication test sample to the creativity neutral control.

2. The method of measuring the creative value of a communication test sample of claim 1 further comprising:

eliciting a numerical score representative of an attribute of the communication test sample from the test audience;

eliciting a numerical score representative of an attribute of the creativity neutral control from the test audience; and comparing the numerical score representative of the attribute of the communication test sample to the numerical score representative of the attribute of the creativity neutral control.

3. The method of measuring the creative value of a communication test sample of claim 1 wherein the communication test sample and creativity neutral control are television advertisements.

4. The method of measuring the creative value of a communication test sample of claim 1 wherein the communication test sample and creativity neutral control are print advertisements.

5. The method of measuring the creative value of a communication test sample of claim 1 wherein the communication test sample and creativity neutral control are radio advertisements.

6. The method of measuring the creative value of a communication test sample of claim 2 wherein:

the attribute of the communication test sample is the preference for a product depicted in the communication test sample over a comparable product; and the attribute of the creativity neutral control is the preference for a product depicted in the creativity neutral control over the comparable product.

7. The method of measuring the creative value of a communication test sample of claim 2 wherein:

the attribute of the communication test sample is the likelihood that the person of the test audience would purchase a product depicted in the communication test sample; and the attribute of the creativity neutral control is the likelihood that the person of the test audience would purchase a product depicted in the creativity neutral control.

8. The method of measuring the creative value of a communication test sample of claim 1 wherein the test audience includes a first test group of one or more persons and a second test group of one or more persons, said method further comprising:

presenting the communication test sample to the first test group; and presenting the creativity neutral control to the second test group.

9. The method of measuring the creative value of a communication test sample of claim 8 further comprising:

eliciting a numerical score representative of an attribute of the communication test sample from the first test group;

eliciting a numerical score representative of an attribute of the creativity neutral control from the second test group; and comparing the numerical score representative of the attribute of the communication test sample to the numerical score representative of the attribute of the creativity neutral control.

10. A method of measuring the creative value of a communication test sample comprising:

presenting a communication test sample to a first test group of one or more persons;

presenting a creativity neutral control to a second test group of one or more persons, the creativity neutral control being a communication created to intentionally lack creativity;

presenting a comparable communication to the first and second test groups;

eliciting a comparison between the communication test sample and the comparable communication from said first group to produce a first comparison result;

eliciting a comparison between the creativity neutral control and the comparable communication from said second group to produce a second comparison result; and comparing the first comparison result to the second comparison result.

11. The method of measuring the creative value of a communication test sample of claim 10 further comprising:

eliciting a numerical score representative of an attribute of the communication test sample from the first test group;

eliciting a numerical score representative of an attribute of the creativity neutral control from the second test group; and eliciting a numerical score representative of an attribute of the comparable communication from the first test group;

eliciting a numerical score representative of an attribute of the comparable communication from the second test group;

comparing the numerical score representative of the attribute of the communication test sample produced by the first test group to the numerical score representative of the attribute of the comparable communication produced by the first group to produce the first comparison result; and comparing the numerical score representative of the attribute of the creativity neutral control produced by the second test group to the numerical score representative of the attribute of the comparable communication produced by the second group to produce the second comparison result.

12. The method of measuring the creative value of a communication test sample of claim 10 wherein the communication test sample, creativity neutral control and comparable communication are television advertisements.

13. The method of measuring the creative value of a communication test sample of claim 10 wherein the communication test sample, creativity neutral control and comparable communication are print advertisements.

14. The method of measuring the creative value of a communication test sample of claim 10 wherein the communication test sample, creativity neutral control and comparable communication are radio advertisements.

* * * * *